April 5, 1927.
H. P. HIMES
1,623,344
ELECTRIC ARC WELDING APPARATUS
Filed July 6, 1920
3 Sheets-Sheet 1
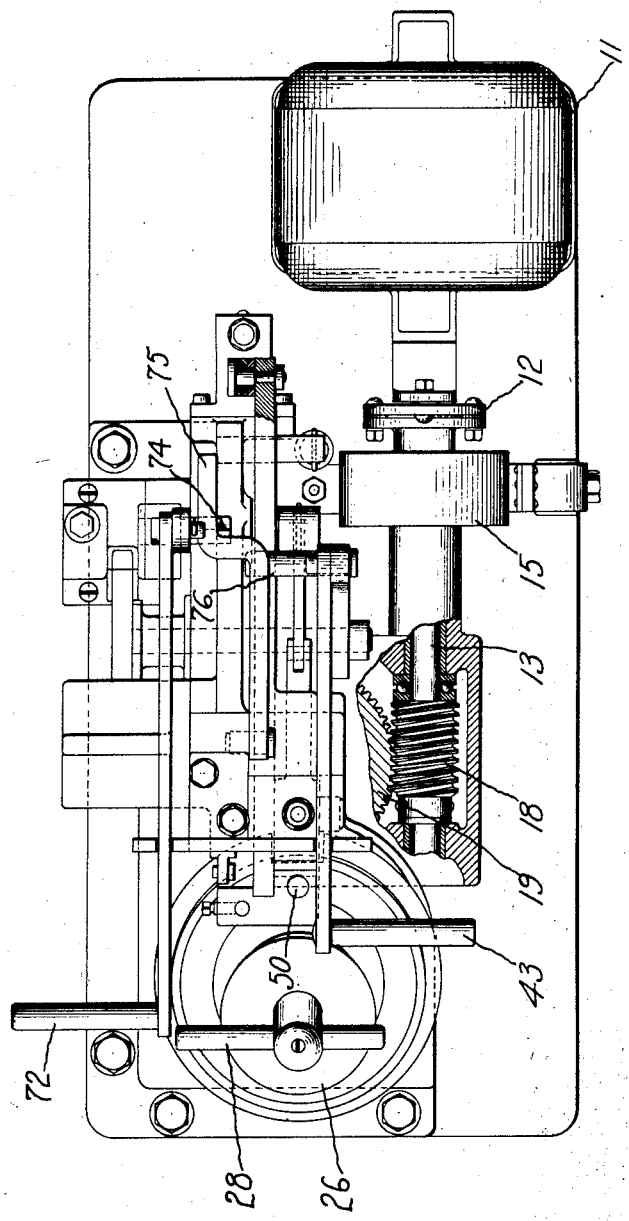
Inventor
Howard P. Himes
By Attorneys
Blackmore, ...

April 5, 1927.
H. P. HIMES
1,623,344
ELECTRIC ARC WELDING APPARATUS
Filed July 6, 1920
3 Sheets-Sheet 2
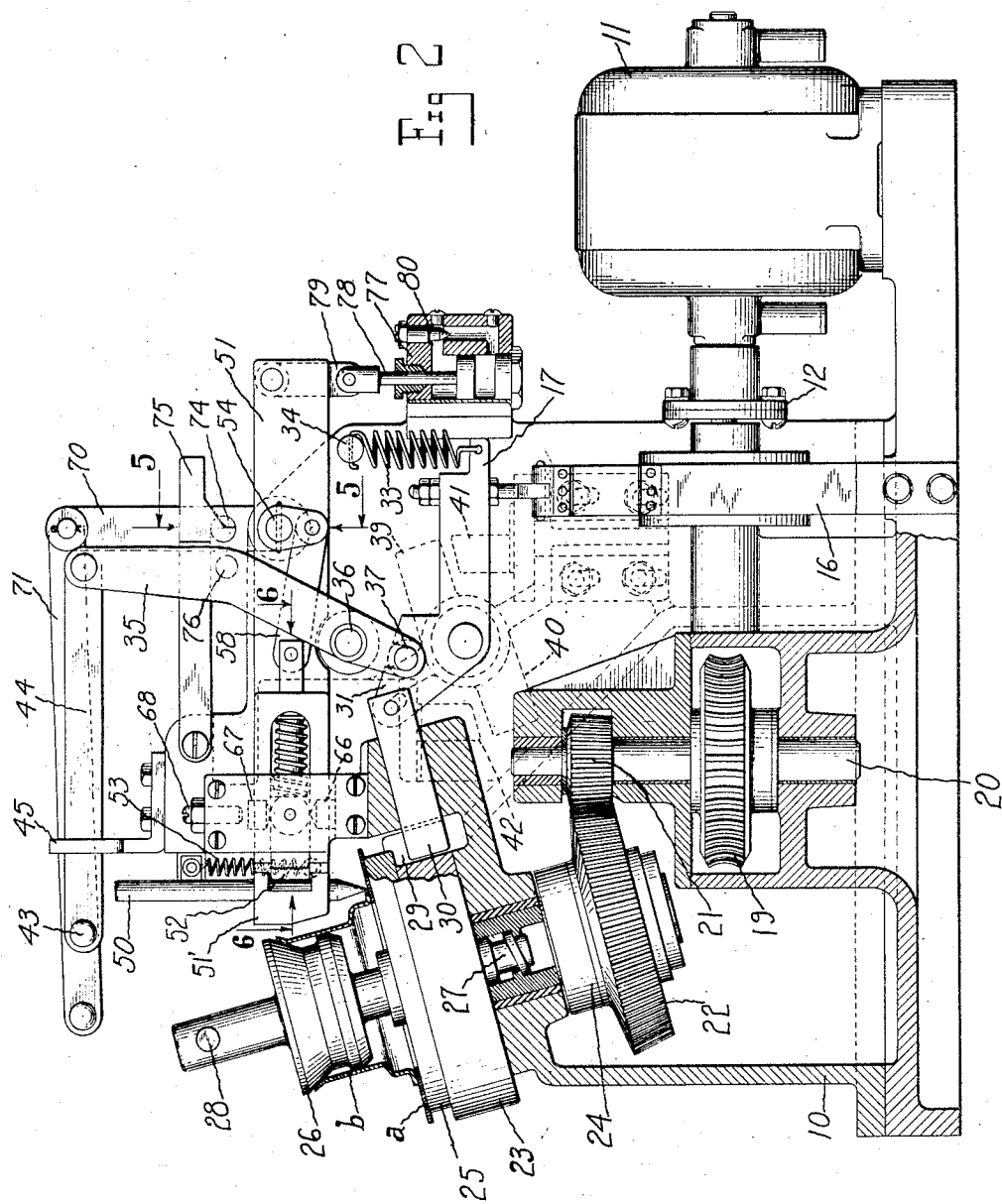
Inventor
Howard P. Himes
By Attorneys
Blackmore, Spencer & Flint

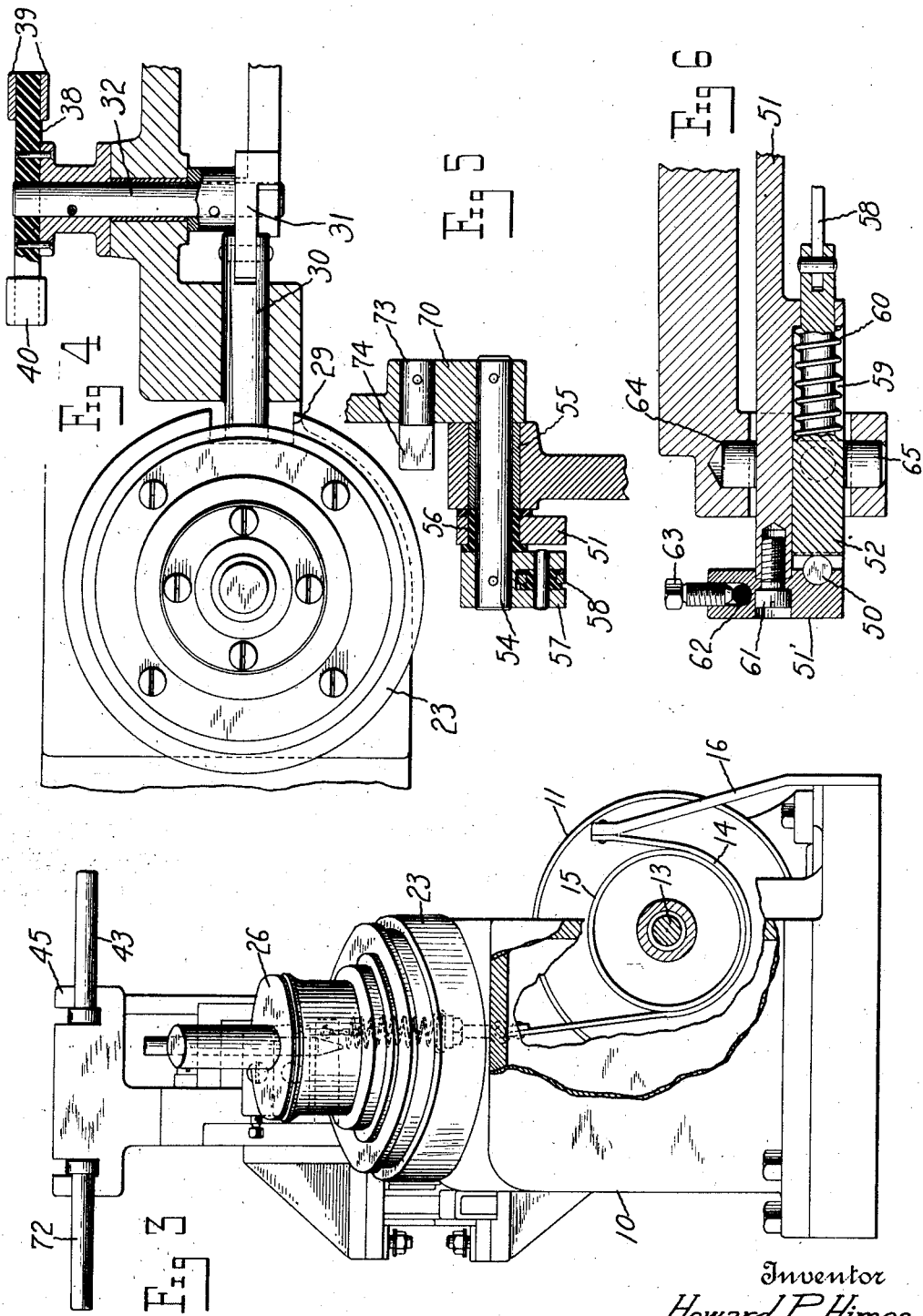

Patented Apr. 5, 1927.

1,623,344

UNITED STATES PATENT OFFICE.

HOWARD P. HIMES, OF DETROIT, MICHIGAN, ASSIGNOR OF ONE-HALF TO GENERAL MOTORS CORPORATION, OF DETROIT, MICHIGAN, A CORPORATION OF DELAWARE.

ELECTRIC-ARC-WELDING APPARATUS.

Application filed July 6, 1920. Serial No. 394,298.

The invention relates to electric apparatus for heating by means of an electric arc and more especially to a machine whereby a cycle of electric welding operations may be performed automatically.

The object of the invention is to provide a machine whereby the heating or welding of an area of annular or other predetermined outline may be made without requiring the welding tool or electrode to be guided or otherwise manipulated by the attendant during the progress of the welding operation.

A further object is to provide a machine of this character in which a weld may be made in a closed path and the welding operation discontinued and the machine stopped when the starting point of the weld is again reached.

A further object is to provide an arc welding machine adapted to utilize an electrode of carbon or analogous material and in which is embodied means for automatically drawing the arc.

With the above and other objects in view as will appear more fully from the following description the invention consists of the features of novelty herein described and set forth in the appended claims.

In the accompanying drawings in which is illustrated one embodiment of my invention, Fig. 1 is a plan view. Fig. 2 a side elevation, and Fig. 3 an end elevation of an arc welding machine especially adapted for welding together two parts along a circular line, each view being sectioned in part to show details. Fig. 4 is a plan view of the chuck and work table showing in connection therewith, in section, the stop device and the switch mechanism.

Fig. 5 is a section on the line 5—5 of Fig. 1, and Fig. 6 is a section on the line 6—6 of Fig. 1.

The structure shown includes a frame 10 which may of course be of any desired character suitable to support the machine parts. A motor 11, preferably an electric motor, is employed as a source of power, the shaft of the motor being connected through a flexible coupling 12 to a shaft 13. A brake 14 is arranged to engage a brake drum 15 secured to the shaft 13, the brake being shown as of the band type although other forms may be employed if desired. One end of the brake is shown as being secured to a standard 16 and the other end is secured to an arm 17 of a lever to be hereinafter described.

The shaft 13 carries a worm 18 engaging with a worm wheel 19 mounted upon the shaft 20. To this shaft is secured gear 21 meshing with gear 22 arranged to drive the work table 23 preferably by means of a friction connection as indicated at 24. The gearing shown and described is merely illustrative, however, of a means for imparting motion to the work table and it will be understood that my invention is not in any way limited to the means shown. The gear ratios will, of course, depend upon the initial speed of the motor and upon the desirable rate of movement of the work relatively to the arc, and the travel of the work table may be varied by selection of suitable mechanical movements to cause the weld to assume other than a circular path if desired.

The work table is shown as provided with chuck members 25, 26, the latter being adapted for rotative and longitudinal clamping movement by the cam or screw connection 27 and the handle 28. Work pieces comprising a flange or ring $a$ and a hub or drum $b$ are shown in position on the work table. The nature of the chuck will vary, of course, with the character of work.

The work table is provided with a notch 29 with which engages a stop device or sliding detent 30. The withdrawal of the detent will permit the table to be rotated and the detent may engage against the flange or edge of the table until the latter has made a complete rotation whereupon the detent may be caused to re-enter the notch thereby bringing the table to rest in its original position. In order to bring about this cycle of operations I connect the detent by a pin and slot connection to one arm 31 of a lever secured to the shaft 32 suitably journaled in the frame. The other arm 17 of the lever is connected, as already pointed out, to the brake band 14, and is also connected to a spring 33 the other end of which is secured to the frame at 34. A lever 35 pivotally supported at 36 is provided with a pin 37 engaging in a slot in the arm of lever 31 so that by movement of the upper end of lever 35 to the left (Fig. 2) the detent 30 may be withdrawn from notch 29 and the brake band 14 may be loosened, the spring 33 being also placed under greater tension. The shaft 32 carries a bar 38 of insulating material (Fig. 4) at one end of which is a contact 39 adapted to engage with contacts 41 to thereby close the circuit to motor 11, and at the other end is a contact 40 adapted to engage contacts 42 to thereby close the welding circuit.

A bar 44 carrying a handle 43 at a point convenient for the operator is connected to lever 35 and slides in a supporting bracket 45.

By grasping the handle 43 and pulling to the left, Fig. 2, it will be seen that the operator will release the work table and the brake, start the motor, and close the welding circuit. As soon as the table begins to rotate the handle may be released, the tendency of the parts to return to their original position due to spring 33 being resisted by the engagement of the detent with the edge of the work table. Upon the completion of one rotation of the table, however, the detent will engage in the notch 29, the two switches will be thrown out, and the brake will be applied. Should the inertia of the parts of the motor and gearing be such that the brake fails to stop them immediately a slight amount of over-running may be permitted due to the frictional connection at 24. While the stop mechanism above described is simple and effective it will be seen that my invention, in its broader aspects, is not limited to any particular form of stop device but may include the use of any known or desired stop mechanism adapted to bring the moving parts to rest and interrupt the welding current after a predetermined cycle of operations.

The welding electrode 50, of carbon or analogous material is supported in a holder 51 being gripped therein by the slidable jaw 52 and the fixed jaw 51'. A spring 53 is connected at one end to the holder and at the other to a portion of the frame. The holder is in the form of a bar and is pivoted upon a shaft 54 journaled in a bearing 55 in the frame, an insulating bushing 56 being interposed between the holder and the shaft. To the shaft is rigidly secured at one end the arm 57, to which is pivoted the link 58, the other end of which is connected to the rear end of sliding jaw 52. This jaw slides in a groove or seat 59 in the face of holder 51, (Fig. 6) and is surrounded by a spring 60 arranged to act against the holder at one end and at the other against a shoulder on the jaw thereby tending to force the jaw forwardly into engagement with the electrode. The jaw 51' may be secured to the holder 51 by a screw 61 and may have clamped thereto, as by screw 63, a conductor 62 connected to any suitable source of welding current, and arranged in circuit with the switch 42. Guides 64, 65, of insulating material are mounted in apertures in the frame and prevent contact of the holder with the frame. Similar bodies of insulating material 66, 67, are arranged respectively below and above the holder to act as limiting stops to determine the amount of movement of the holder. The upper block 67 may be arranged to engage with an adjustable abutment 68, thereby providing means for varying the upward limit of movement of the holder and the length of the arc, as will be clear from the further description.

The end of shaft 54 remote from the arm 57 has rigidly connected thereto a lever 70, to the upper end of which is pivoted a bar 71 adapted to lie in a seat in bracket 45 and provided with a handle 72. A pin 73, cut away on one face as at 74, is supported in lever 70, and a detent 75 is adapted to engage with the face 74 of the pin and thereby hold the lever in its forward position. A pin 76 on the lever 35 extends under the detent 75, (see Fig. 1), in such position that a forward movement of the lever 35 will release the detent from the pin 73.

A dash pot 77 is mounted in such position that its piston rod 78 may be connected to the rear end of holder 51 as by the link 79. The dash pot may be filled with oil and its effect varied by the adjustment of the valve 80.

The operation of the electrode manipulating devices above described is as follows:

When work is to be placed in the machine the handle 72 will be grasped by the operator and drawn forwardly thereby giving a rotary movement to shaft 54, retracting the sliding jaw 52, and placing spring 60 under compression, the movement being continued until detent 75 engages with pin 73. The spring 60 is somewhat stronger than the spring 53, and, as will be seen from Figs. 2 and 5, the holder 51 is pivoted upon the shaft 54 at a point above the longitudinal center of the bar. The placing of the spring 60 under compression therefore draws the holder to its lower limit of movement as shown in Fig. 2. The electrode will now be released and may be removed if desired for convenience in positioning the work. The work may now be placed on the table and clamped by the chuck mechanism. The electrode is then replaced, the lower end being permitted to rest upon the work at the point where welding is to begin. The handle 43 is now pulled forwardly, which, as previously explained starts the motor, releases the work table, and closes the welding circuit. At the same time the movement of the lever 35 brings pin 76 into engagement with detent 75 and thereby releases lever 70. The slidable jaw 52 thereupon moves forward under the influence of the spring 60 and grips the electrode. The holder 51, being no longer stressed toward its lower position is lifted by the spring 53 thereby drawing the arc, the rapidity of this movement being determined by the dash pot 77. The welding operation may now proceed without the attention of the operator since, as previously explained, upon the completion of one rotation of the work the welding circuit is broken and the moving parts automatically brought to rest.

It will be seen that the only operations required of the attendant are to release the electrode clamp, place the work and electrode in position, and pull the starting handle. These operations of course do not require the services of highly skilled workmen and several machines may be served by one attendant. The work will furthermore be of much greater uniformity than is obtainable from hand welding and of much better quality. The arc remains of a predetermined and constant length since the electrode suffers substantially no loss during a single cycle of operations. In any class of work therefore to which the machine is applicable it affords a great saving in time and increase in quantity and excellence of output.

It may be desirable in some instances to vary the extent of travel of the electrode as in making a weld through a portion only of a circumference. It will be seen that such operation may be readily performed by merely varying the location of the stop devices.

It will be understood that many other changes may be made in details of construction without departing from the spirit and scope of the invention and I do not wish to be limited to the particular mechanism herein described.

While I have referred in the foregoing description chiefly to electric welding it is obvious that the machine may be employed for heating, soldering or other analogous operations wherein it may be desirable to treat material with an electric arc.

I claim:

1. In welding apparatus the combination of a work support, an electrode holder movable into two definite and fixed positions relative to the work support, two fixed stops for limiting the movement of said electrode holder, and means for moving the holder in both directions to the extent permitted by said stops, and for holding it in a fixed position away from said work support while a welding operation is being performed upon work supported by said work support.

2. An electric arc machine comprising a work support, an electrode holder movable into two definite and fixed positions relative to said work support, two fixed stops for limiting the movement of said electrode holder, and means for moving said electrode holder toward the work support and into engagement with one of said stops and for simultaneously releasing an electrode carried by said electrode holder.

3. An electric arc machine comprising a work support, an electrode holder movable toward and from the work support, electrode gripping means on said holder, means for retaining said gripping means out of operation, and means operable when said gripping means is released to lift the electrode holder and draw the arc.

4. An electric arc machine comprising a work support, an electrode holder movable toward and from said support, electrode gripping means carried by said holder, manually operable means to retain said gripping means out of operation, and means actuated upon the starting of the machine to release said gripping means and to move the electrode away from the work.

5. An arc welding machine comprising a rotatable work table, an electrode holder movable toward and from said table, means for moving said electrode holder away from the table to draw the arc, means for supplying current to said holder, means for driving said table, and a single device operable to control said holder moving means, said current supplying means, and said driving means.

6. An arc welding machine comprising a rotatable work table, driving means therefor, a brake for said driving means, an electrode holder, means for supplying current thereto, and means automatically operable after one rotation of said table to stop said driving means, apply said brake, and interrupt said current.

7. An electrode holder for carbon electrode comprising a pivoted arm, a jaw movably mounted on said arm, means for moving said jaw to grip said carbon, and means for moving said jaw to release said carbon, said releasing means operating also to move said pivoted arm in one direction.

8. An electrode holder for carbon electrodes comprising a pivoted arm, a spring operating to move it in one direction, a sliding jaw on said arm, a spring tending to cause said jaw to grip the carbon, and means for simultaneously controlling said springs to hold them out of operation or to cause them to actuate the grip and raise the electrode.

9. An electrode holder comprising a pivoted arm, an electrode gripping device thereon, a spring for actuating said device, a spring for moving the arm in one direction, a retarding device for controlling the movement of the last-mentioned spring, and a single means operative to move both said jaw and said arm in opposition to the action of said springs.

10. An electric arc machine comprising a work support, a holder adapted to receive an electrode, means for causing said work support to travel so as to produce relative movement between the electrode and work, and automatic means operative to stop the travel of the work support after a predetermined movement.

In testimony whereof I affix my signature.

HOWARD P. HIMES.